United States Patent

Schmitt et al.

[15] 3,702,899

[45] Nov. 14, 1972

[54] DIGITAL VIDEO TRANSMITTER

[72] Inventors: Peter C. Schmitt, Madison Heights; Carl W. Vette, Clawson; Amos J. Meyer, II, Ferndale, all of Mich.

[73] Assignee: Center For Scientific Studies, Inc., Southfield, Mich.

[22] Filed: Jan. 13, 1971

[21] Appl. No.: 106,010

[52] U.S. Cl. .............178/7.2, 178/DIG. 3, 179/2 TV

[51] Int. Cl. ..............................................H04n 7/12

[58] Field of Search .........178/DIG. 3, 7.2; 179/2 TV

[56] References Cited

UNITED STATES PATENTS

| | | | |
|---|---|---|---|
| 2,957,941 | 10/1960 | Covely | 178/DIG. 3 |
| 3,566,023 | 2/1971 | Smierciak | 178/DIG. 3 |
| 3,061,670 | 10/1962 | Oster et al. | 179/2 TV |
| 3,538,247 | 11/1970 | Quinlan et al. | 178/DIG. 3 |

*Primary Examiner*—Robert L. Griffin
*Assistant Examiner*—Richard K. Eckert, Jr.
*Attorney*—Cullen, Settle, Sloman & Cantor

[57] ABSTRACT

A system for transmitting visual image information over telephone lines is disclosed. The system comprises a vidicon, video preamplifier, signal conditioning circuitry, an analog to digital converter and timing circuitry. The vidicon scanning rate is slow enough to permit transmission of the digitized signal in real-time without intermediate buffering via a conventional telephone system.

1 Claim, 1 Drawing Figure

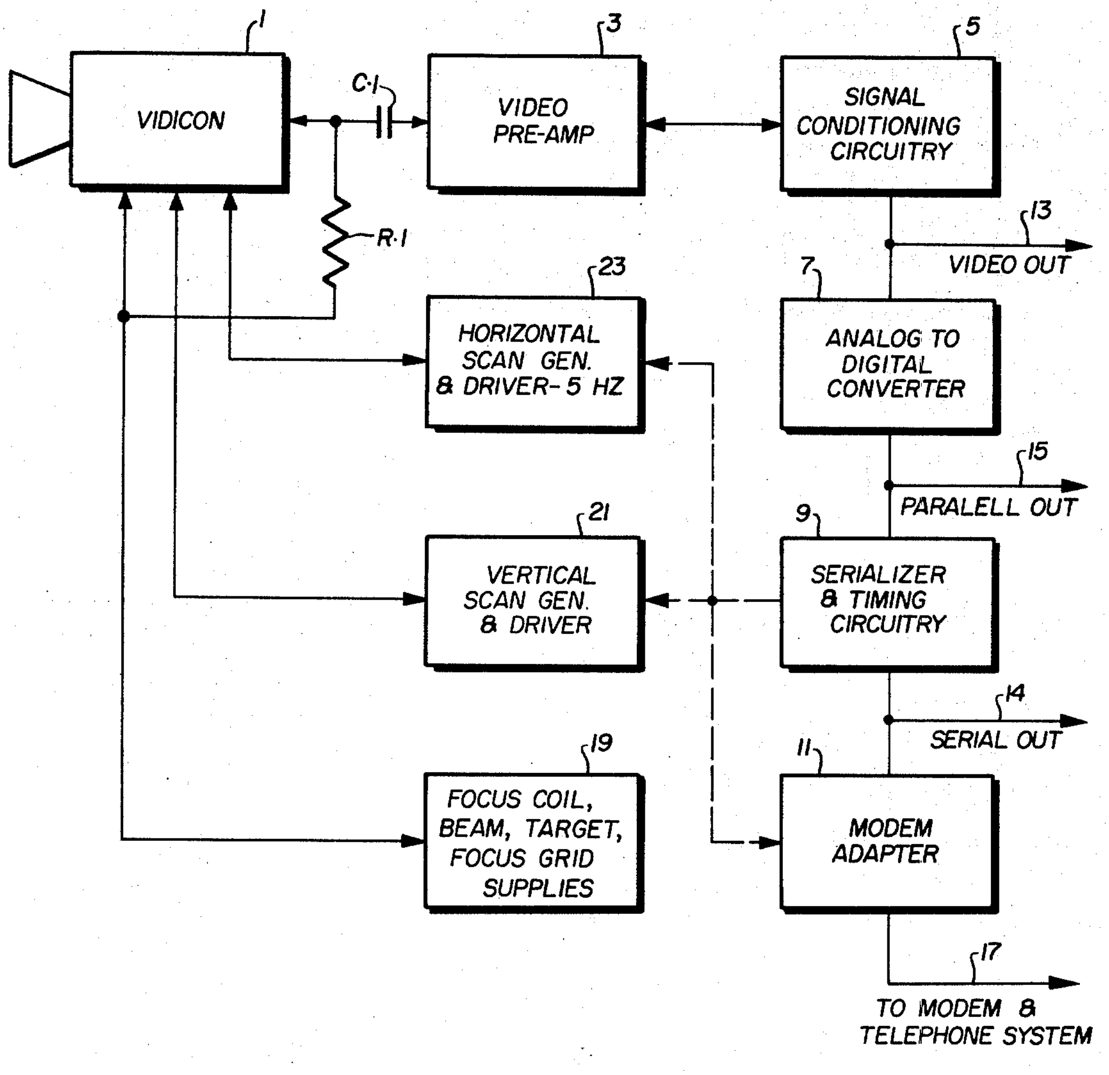
INVENTORS
PETER C. SCHMITT.
CARL W. VETTE.
AMOS J. MEYER, II.
BY
CULLEN, SETTLE, SLOMAN & CANTOR.
ATT'YS.

DIGITAL VIDEO TRANSMITTER

BACKGROUND OF INVENTION

This invention relates to electro-optical scanning devices and more particularly to a system for transmitting the output of an electro-optical scanner to a computer over telephone lines.

The use of an electro-optical scanning system as the input to a computer is known in the art. In these prior art systems the link between the electro-optical scanning system and the computer must be other than conventional telephone lines because the scanning rate is too high. A voice grade or dial-up telephone system can only handle a bit rate of up to 2,000 bits per second; specially conditioned leased lines can handle up to 9,600 bits per second. The bit transmission rate from a conventional electro-optical scanner can be as high as 500,000 bits per second.

This invention provides an electro-optical scanner that can be used to transmit the information over conventional telephone lines. The scan rate of a vidicon is reduced and the output of the vidicon is digitized before transmission over the telephone lines. In this respect it should be noted that the prior art systems mentioned above do not use vidicon scanners. However, the output of a vidicon which is an analog signal has been digitized before this invention. The prior art vidicon digitizing systems have not been able to slow down the scan rate sufficiently to digitize and transmit the signal over voice grade telephone lines directly from the vidicon. These systems require intermediate equipment such as memory storage devices.

A major problem in trying to slow-scan a standard vidicon tube is that the output signal disappears at scan rates lower than about 10 lines per second. It was discovered that the vidicon output signal is not derived solely from light-stimulated resistance changes as popularly believed, but is a complex function of both resistance and capacitance. As a result of this discovery, a useful signal output at very slow scanning rates has been achieved.

This invention provides a system for slowing the scanning rate and digitizing the output signal of the vidicon without the use of complex additional circuitry. With this invention the output can be transmitted to a remote computer by means of a conventional telephone system.

SUMMARY OF THE INVENTION

The invention comprises a vidicon scanner, a video preamplifier; a signal conditioning circuit; an analog to digital converter; timing circuitry and a modulator-demodulator adapter.

The vidicon is scanned at a slow rate and the slow scan output signal from the vidicon is coupled to the input of the video preamplifier. The output of the video preamplifier and signal conditioner is digitized and the digital signal is transmitted to a remote computer via a conventional telephone system.

It is therefore the principal object of this invention to provide an electro-optical scanning system the output of which is digitized and transmitted in realtime without intermediate buffering to a remote location over a conventional telephone system.

DESCRIPTION OF THE DRAWING

The above mentioned and other objects of the invention will become readily apparent from the following detailed description of the invention when read in conjunction with the annexed drawing in which the single FIGURE shows in block diagram form a preferred embodiment of the invention.

DESCRIPTION OF THE INVENTION

The single FIGURE of the drawing shows a conventional vidicon tube 1, a horizontal scan generator and driver 23, a vertical scan generator and driver 21 and the focus coil, beam, target, and focus grid supplies 19. This circuitry is the circuitry generally used with a vidicon tube. However, unlike the conventional vidicon system, the scan rate of vidicon tube 1 is considerably lower than normal.

The output signal from the target of vidicon 1 flows through a load resistor R1, connected between the target and the target supply 19. Capacitor C1 couples the vidicon output signal to the video pre-amp 3. Resistor impedance of preamplifier 3 is approximately 50 megohms. The resistance of the load resistor generally used with vidicon tubes is not as high as 15 megohms.

Video preamplifier 3 is a high input impedance and low-noise amplifier having a restricted upper bandwidth. Amplifiers of this type are well known in the art and are available on the market. The combination of a high impedance, low-noise, upper bandwidth-restricted amplifier with the high load resistance R1 provides a usable output signal at the slow scan rate, because of the discovery that the vidicon output signal has a substantial capacitive component.

The output of video preamplifier 3 is coupled to the signal conditioning circuitry 5. Signal condition circuitry 5 removes noise still present on the signal and enhances the signal. This circuitry is essentially conventional well known filter circuitry. The video output of conditioning circuitry 5 can then drive a slow scan television monitor, for example, as is indicated by the video output line 13.

The video output signal from conditioner 5 is input to a conventional analog to digital converter 7. The output signal of a vidicon is an analog signal of the image being scanned; therefore, the output of converter 7 is a digital representation of the scanned image. The output of converter 7 which is a parallel output can be input directly to a local computer as is indicated by the parallel output line 15.

The output of converter 7 is applied to a serializer circuit and timing circuit 9. Again, this circuitry is conventional well known circuitry. The output of serializer 9 is a serial output and since either parallel or serial information can be applied to a computer the output of serializer 9 could be applied to a local computer as indicated by the serial output line 14.

The output of serializer 9 is input to a modem adapter 11. Modem adapter 11 which is a modulator-demodulator adapter is coupled to a conventional modulator-demodulator (not shown). The output of the modulator-demodulator is coupled to a conventional telephone system for transmission to a remote computer. Modem adapter 11 is conventional well known circuitry. Depending upon the circumstances or conditions of the overall system it may be necessary to add parity bits to the output signal from serializer 9 or it may be necessary to convert this signal to the American Standard Code. Modem adapter 11 then is merely circuitry used to adapt the output of serializer 9 to the system. The output of modem adapter 11 is, as has been mentioned above, input to a modulator-demodulator (not shown) for transmission to a remote computer via a conventional telephone system.

The dotted lines connecting serializer and timing circuitry 9 to horizontal and vertical generators and drivers 23 and 21, respectively, and to modem adapter 11 are given to show the inter-relationship or tie-in with reference to the sampling rate. The basic digitizing rate must be the same for the scanning control and for the input to the modem adapter. This, of course, is obvious.

While the output of serializer 9 is shown applied to the input of modem adapter 11, this output could be applied directly to the modulator-demodultor (not shown in the drawing) and then transmitted to the remote computer over the telephone system. Modem adapter 11, as has been mentioned, is merely used to adapt the serial output to the system when the overall system operates in such a manner that the serial output cannot be used directly.

From the foregoing description it is apparent that this invention provides a system for transmitting electro-optically scanned information to a remote location via a conventional telephone system. In addition, it will be obvious to those skilled in the art that various changes and modifications can be made to the preferred embodiment without departing from the spirit and scope of the invention as set forth in the appended claims.

What I claim is:

1. A system for electro-optically scanning an image and for transmitting a signal manifesting a digital version of the scanned image over communication lines have a defined modulated bit rate capability, said system comprising:

a vidicon for scanning said image and for providing at an output thereof an analog signal manifesting the scanned image, said vidicon having a scan rate of less than ten lines per second;

a capacitor;

a high input impedance, low noise video amplifier having a restricted upper bandwidth determined by scan rate, said amplifier being coupled through said capacitor to and being responsive to the signal at said vidicon output for providing a signal at an output thereof which is a version of said vidicon output signal;

a high impedance load resistor coupled between said vidicon output and a supply source;

filtering circuitry for filtering noise from said amplifier output signal to provide a video signal;

an analog to digital converter circuit responsive to said video signal for providing a parallel digital signal manifesting said video signal;

a serializer for converting said parallel digital signal to a serial digital signal;

a modulator-demodulator adapter for modulating said serial digital signal and for providing said modulated signal to said communication line, the scan rate being selected so that the bit rate of said modulated signal is said defined modulated bit rate.

* * * * *